April 9, 1946.  H. SICULAR  2,398,196
METHOD AND APPARATUS FOR FLUOROSCOPIC PERSONNEL INSPECTION
Filed Sept. 18, 1944
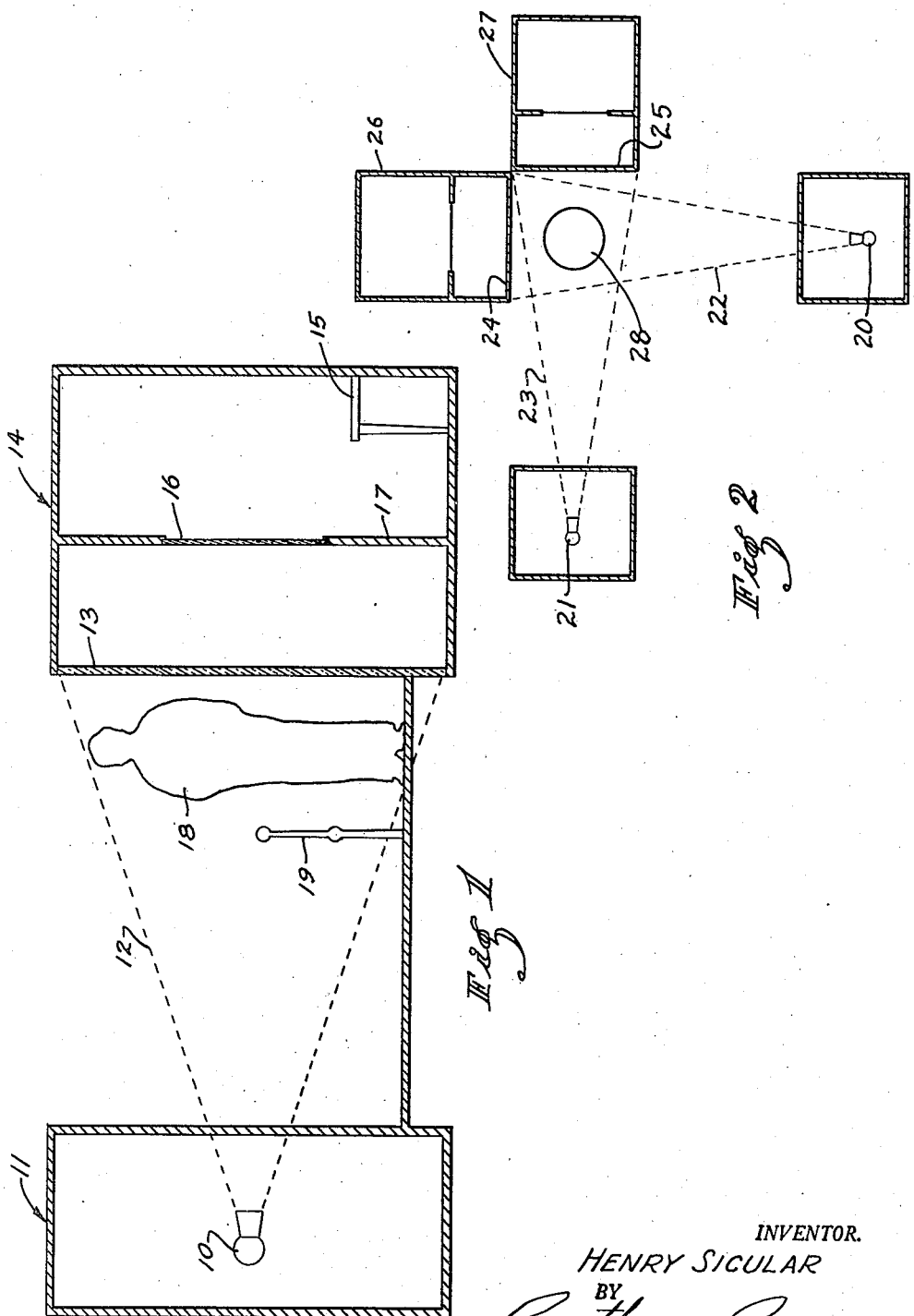
INVENTOR.
HENRY SICULAR
BY
Castberg & Roemer
ATTORNEYS Patented Apr. 9, 1946

2,398,196

UNITED STATES PATENT OFFICE 2,398,196

METHOD AND APPARATUS FOR FLUOROSCOPIC PERSONNEL INSPECTION

Henry Sicular, Berkeley, Calif.

Application September 18, 1944, Serial No. 554,681

5 Claims. (Cl. 250—50)

This application relates to the inspection of persons fluoroscopically and particularly to a method and apparatus for detecting the presence of articles carried by or concealed in clothing or accouterment of dress or travel.

In a co-pending application, Serial Number 438,696, filed by me on April 13, 1942, and entitled "Fluoroscopic detection apparatus," there is disclosed an apparatus, the current widespread use of which, has established to the satisfaction of certain industries which employ large numbers of workers, that loss through theft of small tools and merchandise represents a tremendous item of operating expense heretofore usually unrecognized and never substantially corrected. For example, estimates made possible through facts disclosed by the use of the apparatus disclosed in said application, place the probable loss in industries where small tools and equipment are handled by workers at a minimum of twenty-five cents per day per man. In other words, it is now known that for every ten thousand workers leaving an industrial plant such as a shipyard or aircraft factory at the end of a day's work at least twenty-five hundred dollars worth of tools and equipment, the property of the plant or other workers, is being carried away. This condition prevails in spite of the fact that uniformed armed guards may be stationed at the point of exit from the plant.

By the use of the invention disclosed in the copending application referred to herein such losses have been reduced to a negligible quantity. The apparatus employed, briefly described, comprises a field of X-ray and a fluoroscopic screen so arranged that the image of a person standing within said field is projected upon the screen. An observer of the screen can easily detect the presence of tools and other articles concealed in the clothing or in lunch boxes or packages carried by the person under inspection. The most general use of such apparatus is, as stated, in large industrial plants where it is employed to check personnel leaving the plant. In practice one or two machines are used in conjunction with several exit passages or gates. As the workers file toward the gates, guards single out some of the individuals, usually about one from every twenty or thirty workers, and request them to step aside for inspection. The exact locality of the apparatus which is usually portable is unknown to the workers so that they cannot avoid inspection by selection of a certain exit gate. Furthermore, the individuals are selected from the crowd at the will of the guards so that each individual is a possible subject for inspection every time he leaves the plant. The result of this last fact is that the mere presence and use of the apparatus results in a remarkable reduction of loss by theft.

The use of the apparatus briefly described above has proven entirely satisfactory. Due, however, to the complete novelty of the idea to management as well as personnel and to the fact that the X-ray employed for inspection is known to be an inherently dangerous agent certain problems have arisen the solution of which are the subject of the present application for patent.

The human body being relatively impenetrable to X-ray requires an amount of X-ray for ordinary clinical fluoroscopy which, measured in terms of power and distances, is somewhat as follows:

Voltage, 85 kv.
Milliamperes, 5 ma.
Tube to body distance, 14 inches.
Tube to screen distance, 24 inches.

Under these conditions the body receives radiation which is expressed in terms of units of X-ray of approximately 25r per minute. As a practical matter the tube to body distance of 14 inches and tube to screen distance of 24 inches does not provide adequate space for convenience in observing persons in the more or less informal manner that is desirable for inspection purposes. Consequently, the tube to screen distance was increased to 42 inches while the tube to body distance remained at 14 inches and a passageway of convenient proportions was thereby made possible. However, since the illumination of the screen varies inversely as the square of the distance from tube to screen and varies directly with the milliamperage the new spacing required approximately triple the power factors for comparable illumination so that with 85 kv. the amperage was increased to 15 ma. The maximum allowable tolerance of the human body considered from the point of view of safety is .1r per day if the exposure is to be continued indefinitely. It has been determined that an examination period of six seconds should be allowed for personnel inspection work. As such an inspection under the usual clinical conditions effects a body exposure of 7.5r no person should be examined more often than once in seventy-five days. As such a time limit was deemed impractical it was avoided to a large degree by variation in power and distance factors and by the use of three X-ray tubes energized successively for a maximum of two seconds each so that three parts of the body were exposed separately for two seconds with an overlap of fields bringing the total exposure of any one part of the body to a maximum of three seconds. By this expedient the effective radiation per examination was reduced 3.75r.

Considering that the exposure of the subject and the illumination of the screen vary inversely with the square of the distance from the tube to the body and to the screen respectively it is found that by increasing the tube body distance from 14 inches to 24 inches which can be accomplished practically without disturbing the tube screen distance of 42 inches, each inspection results in a body exposure of 1.2r. Since .1r per day is allowable this permits an examination of the same individual every twelfth day for an indefinite period of time without danger of overexposure.

While an inspection of any single individual once in twelve days is more than adequate for the purposes of the apparatus described above it places a limit on the use of the apparatus which for certain purposes may prove undesirable.

Another limitation on such apparatus is that of space. For example, an installation providing a tube to body distance of 24 inches and a tube to screen distance of 42 inches leaves an area just 18 inches wide to be occupied by the subject of inspection. For certain applications a less confining arrangement is more to be desired.

The power factors of the example given, i. e. 85 kv. and 15 ma. also give rise to objections in that everything over 85 kv. at 5 ma. requires a costly type of forced cooled X-ray tube. It also requires a larger transformer, usually with rectifying valve tubes and expensive control apparatus. Furthermore the electric supply line required for operating an apparatus with these higher power factors is in excess of the conventional lighting circuit so that the installation of special power supply circuits is made necessary.

Using equipment having the power and space factors of the example given requires three tubes energized one at a time to scan the full length of the subject's body because a single tube is inadequate to project an image of a body 6 feet tall against a screen where the tube screen distance is only 42 inches. To increase the tube screen distance to permit the use of a single tube would introduce a great many practical objections, because this distance would have to be approximately 90 inches to obtain the desired field, and to obtain the minimum required illumination at such a distance the power factors would have to be increased approximately four times for comparable screen illumination. Thus operation at 85 kv. and 60 ma., or alternately, 170 kv. and 15 ma. would become necessary. A machine with a power factor of this order would cost several times as much as the three tube machine of the example given and would also involve even greater bulk, more intricate and delicate equipment and substantially heavier power lines.

It is therefore the object of the present invention to overcome the disadvantages enumerated above and to provide a method and apparatus for fluoroscopic personnel inspection in which the power factors are smaller and the distance factors greater than has heretofore been possible. A further object of the invention is the provision of a method and apparatus by means of which a routine fluoroscopic inspection may be made at least as often as once a day on any individual without danger of exposing the individual to more than his normal body tolerance to the effect of X-ray. These and further objects and advantages of the invention are made apparent in the following specification wherein the invention is described in detail with reference to the accompanying drawing.

Fig. 1 is a diagrammatic view in elevation of an apparatus embodying the present invention, and Fig. 2 is a diagrammatic view in plan illustrating a modification of the invention.

While a certain value or strength of X-ray field is known to be necessary to effect penetration of the human body on a fluoroscopic screen, this invention provides a method whereby a field of much lesser strength is adequate for the practical penetration of ordinary wearing apparel on the body, luggage and other accouterment. A person standing before a fluoroscopic screen in a field of X-ray of considerably less intensity than is required as a minimum for clinical purposes produces an image which appears as an opaque or impenetrable body clothed in layers of penetrable substances which are his clothing. Any articles of metal or other relatively dense materials such as bottles of liquid or rolls or packets of paper concealed in or by the clothing are therefore clearly visible in the fluoroscopic projection of a weak field so long as they do not lie in a position to be concealed by the dark image of the body.

The present invention therefore contemplates the provision of an X-ray field of such strength that it will penetrate clothing though it is insufficient to effect penetration to any practical extent of the human body, then subjecting a person to said field from different angles with respect to a fluoroscopic screen in the field so that an image of the person on the screen will disclose a penetrating view of all of the person's clothing.

Generally speaking this may be accomplished in two ways, one of which is illustrated schematically in Fig. 1 of the accompanying drawing. In this figure an X-ray tube 10 is shown as disposed within a suitable enclosure 11 and arranged to project a field indicated by dotted lines 12 against a fluoroscopic screen 13 which forms one wall of an observer's booth 14. An observer seated at 15 within the booth looks through a lead glass window 16 in a lead insulated partition 17 at the back of the screen 13 upon which will be projected the image of a person occupying the position indicated at 18. A guard railing such as indicated at 19 or other suitable structure may be employed to confine the person to approximately the proper position with regard to the screen 13. Alternatively the front wall of the housing 11 may be extended to the position of the guard railing 19, thus providing a narrow passageway which confines the person being inspected to the proper position within the field of X-ray emanating from the tube 10. With the structure shown in Fig. 1 the person to be inspected steps into the designated position and is requested to turn or pivot through 90 degrees to present first a side profile image on the screen 13 and then a front or back profile image on the screen so that a penetrated view of all of his clothing has been produced on the screen for observation.

Another way of accomplishing the same result of viewing a person fluoroscopically from at least two angles in an X-ray field sufficient to penetrate his clothing but not his body, is illustrated schematically in Fig. 2 which is a plan view showing two X-ray tubes 20 and 21 arranged to project fields 22 and 23 respectively against fluoroscopic screens 24 and 25. The screens 24 and 25 may be observed from darkened enclosures 26 and 27, there being a separate observer for each screen. With this arrangement a person standing at the station indicated by the circle 28 is observed from two angles presenting two profiles which together effect penetration of all of the clothing and will therefore result in disclosure to the observers of any article concealed by the clothing.

A modification of the method and apparatus disclosed in Fig. 2 consists in separating the two units there disclosed so that a person may be inspected first from one angle and then at a later time from a different angle. The modification last described has advantages for certain uses such for example as where it is desired to conduct an inspection of a person without his knowledge. The observer's booth and enclosure for the X-ray tube may be concealed behind ordinary walls penetrable to X-ray. It is possible to arrange one station at a point where a person will be exposed to observation upon checking his hat or signing a register. Another station may be arranged for a view from a different angle as the person stops to open a door or hesitates at the top of a stairway. In this manner as well as in various modifications suggested thereby it is possible to produce a fluoroscopic projection of a person on two screens and from two different angles without calling attention to the fact that an inspection is being made, thus making known the presence of firearms, cameras or other articles which may be forbidden in any building or plant. It has been proven by experiment that an exposure with a tube to screen distance of 90 inches with power factors of 85 kv. and no more than 5 ma. produces an image which readily exposes objects concealed in clothing, lunch boxes or suitcases and the like. Such an exposure for a period of six seconds constitutes less than the permitted tolerance of .1r per day so that a person might be inspected once every day indefinitely with perfect safety.

The tube to screen distance of approximately 90 inches is necessary where a single tube is used and the image of the entire body is projected on the screen at one time. However, when more than one tube is used and the image is projected in sections by exposing first one portion of the body and then another, the tube to screen distance may be much shorter and the power factors may be correspondingly reduced to produce the same illumination of the screen and the same body exposure. Recent operations demonstrate that with a tube to screen distance of 42 inches power factors of 85 kv. and 1 ma. produce a satisfactory image. Under these conditions a six second examination produces less than the permitted body tolerance of .1r so that an inspection of any single individual may be conducted as frequently as every day indefinitely with a wide margin of safety.

The term clothing as used herein is to be taken as including wearing apparel and other accouterment of dress or travel such as bags, packages and lunch containers etc.

Having thus described my invention, what I claim and desire to secure by Letters Patent is:

1. The method of inspecting a person by X-ray to detect articles concealed by clothing without exposing the person to more than .1r which comprises projecting a fluoroscopic image of the person with an X-ray tube not exceeding the equivalent of 85 kv. and 5 ma. in power factors at a tube to body distance of approximately seventy-two inches and for a time period not exceeding six seconds.

2. The method of inspecting a person by X-ray to detect articles concealed by clothing without exposing the person to more than .1r which comprises projecting a fluoroscopic image of the person with an X-ray tube not exceeding the equivalent of 85 kv. and 5 ma. in power factors at a tube to body distance of approximately seventy-two inches and for a time period not exceeding six seconds, and turning the person during the projection of said image.

3. The method of inspecting personnel for concealed articles which comprises creating fluoroscopic images of a person to be inspected in a field of sufficient intensity to penetrate clothing without producing an effective penetrated image of all parts of the body and for a time which limits the exposure to X-ray in each complete inspection to less than .1r.

4. The method of inspecting personnel for concealed articles which comprises creating fluoroscopic images of a person to be inspected in a field of sufficient intensity to penetrate clothing without producing an effective penetrated image of all parts of the body and for a time which limits the exposure to X-ray in each complete inspection to less than .1r and turning the person in said field.

5. The method of inspecting personnel for articles concealed by clothing which comprises creating a fluoroscopic image of a person in a field of X-ray of intensity sufficient to penetrate clothing without visibly penetrating all parts of the body whereby a person can be effectively examined for the detection of articles concealed by clothing with an exposure to X-ray of as little as .1r.

HENRY SICULAR.